C. R. WELCH.
AUTOMOBILE LOCK.
APPLICATION FILED JULY 24, 1919.
1,331,084.
Patented Feb. 17, 1920.
2 SHEETS—SHEET 1.
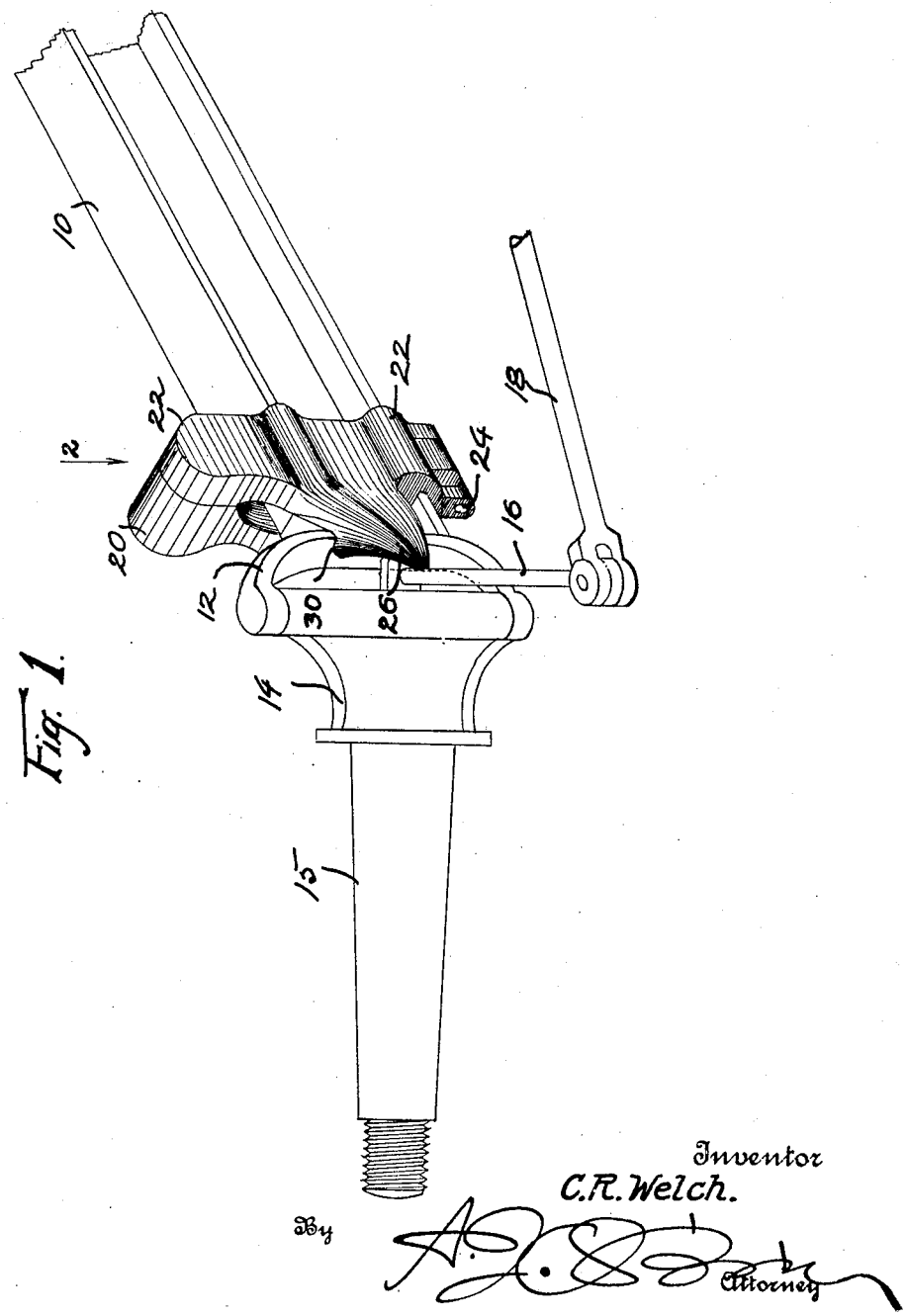
Inventor
C.R. Welch.

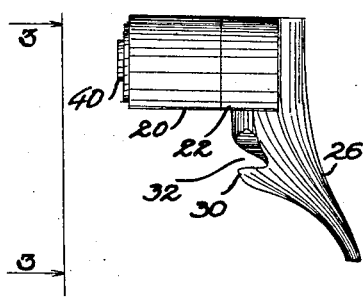
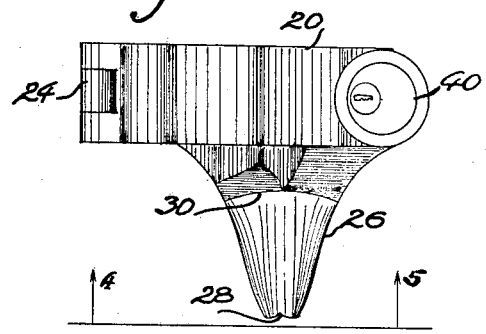
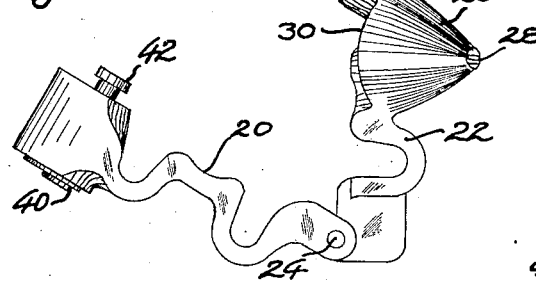
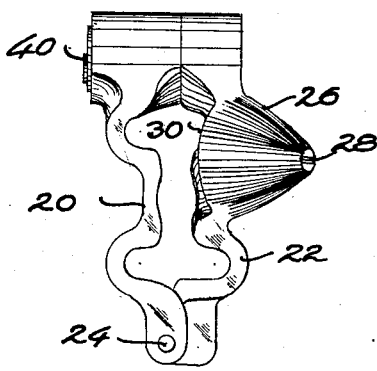
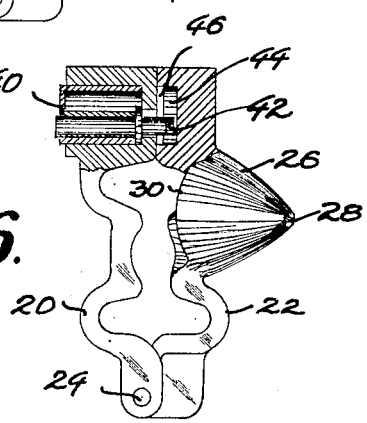

UNITED STATES PATENT OFFICE.

CLARENCE R. WELCH, OF DENVER, COLORADO.

AUTOMOBILE-LOCK.

1,331,084.　　　　Specification of Letters Patent.　　Patented Feb. 17, 1920.

Application filed July 24, 1919. Serial No. 312,896.

*To all whom it may concern:*

Be it known that I, CLARENCE R. WELCH, a citizen of the United States, residing at the city and county of Denver and State of Colorado, have invented certain new and useful Improvements in Automobile-Locks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates more particularly to devices for locking the steering mechanism of an automobile against turning.

The object of the invention is to provide a device which will hold the front wheels of an automobile, after they have been set at an angle, in the angular position, so that the machine can be run only in circles.

Briefly, the invention comprises two members shaped to fit about the front axle of an automobile and adapted to be locked together. One of the members carries a projecting nose which is adapted to engage one of the steering arms when the wheels are turned at an angle, the nose having thereon a shoulder to engage a stationary part connected with the automobile axle to prevent longitudinal movement of the lock on the axle. This stationary part preferably is a yoke mounted on the axle and carrying a wheel knuckle.

In the drawings:

Figure 1 is a perspective, showing the device in use.

Fig. 2 is a plan view indicated by the arrow 2 of Fig. 1.

Fig. 3 is a side view, indicated by the line 3—3 of Fig. 2.

Fig. 4 is an end view, showing the lock in open position looking in the direction of the arrows of line 4—5 of Fig. 3.

Fig. 5 is an end view from the line 4—5 of Fig. 3.

Fig. 6 is a view similar to that of Fig. 5 but showing a portion of the lock in section to indicate in a general way the mounting of the lock mechanism.

The lock is mounted upon the axle 10 of an automobile, this axle having a stationary yoke 12, to which is pivotally connected the knuckle 14, which carries the stub axle 15 and a wheel. A steering arm 16 is connected with the knuckle 14 and with a transverse steering rod 18.

The present invention comprises two members, 20 and 22, shaped to fit about the automobile axle 10, which in this case is shown as an I-beam. The members 20 and 22 are pivotally connected at 24. The member 22 carries a nose 26, which projects forwardly and laterally, the end of the nose having a small groove 28 therein adapted to engage about the steering arm 16 when the wheel on the stub axle 15 is set at the limit of its turning movement. A shoulder 30 formed by a recess 32 is provided on the nose 26 to engage against the yoke 12. This shoulder prevents movement of the members 20 and 22 along the axle 10.

Any suitable locking device may be mounted on the members 20 and 22, such as a tumbler lock 40, which is mounted in the member 20, this lock having a spindle carrying an elongated head 42, adapted to pass into a recess 44 in the member 22, with the ends of the head 42 in engagement behind shoulders 46 when in locked position.

In operation, the parts are opened as shown in Fig. 4. The members are then placed about the axle 10, swung together and locked as shown in Fig. 1, the lock itself assuming the position indicated in Fig. 6. Since the shoulder 30 engages the yoke 12, and the nose 26 engages the arm 16, the device cannot slide along the axle; and the arm 16, together with the stub axle 15, on which the axle is mounted, cannot be moved. Under such conditions the car can be turned only on the arc of a circle, which obviously prevents any considerable forward movement of the car, and consequently any unauthorized use thereof.

I claim:—

1. In an auto lock, members adapted to be clamped about the front axle, means to engage a wheel-supporting yoke fixed on said axle and to prevent movement of the lock longitudinally of the axle, and a projecting nose on one of said members adapted to engage an adjacent steering arm to prevent movement thereof in one direction.

2. In an auto lock, members adapted to be clamped about the front axle, and a projecting nose on one of said members adapted to engage an adjacent steering arm to prevent movement thereof in one direction, said nose having a shoulder thereon adapted to engage a relatively stationary part to prevent movement of the lock on said axle.

3. In combination, a front axle, a yoke fixed on said axle, a stub axle movably connected with and carried by said yoke, a steering arm connected with said stub axle, members locked about said front axle, a nose projecting from one of said members and engaging said steering arm when set in an angular position to prevent movement thereof in one direction, and means on one of said members engaging said yoke to prevent movement of said members longitudinally of the axle.

4. In combination, a front axle, a stub axle movably connected therewith, a steering arm connected with said stub axle, members locked about said front axle, and a nose projecting from one of said members and engaging said steering arm when set in an angular position to prevent movement thereof in one direction, said nose having a shoulder thereon in engagement with a stationary part on said front axle to prevent movement of said lock members longitudinally on said front axle.

In testimony whereof I affix my signature.

CLARENCE R. WELCH.